US009852514B2

(12) United States Patent
Petiot et al.

(10) Patent No.: US 9,852,514 B2
(45) Date of Patent: Dec. 26, 2017

(54) MULTI-SCALE METHOD FOR MEASURING THE SHAPE, MOVEMENT AND/OR DEFORMATION OF A STRUCTURAL PART SUBJECTED TO STRESSES BY CREATING A PLURALITY OF COLORIMETRIC SPECKLED PATTERNS

(71) Applicants: EUROPEAN AERONAUTIC DEFENCE AND SPACE COMPANY EADS FRANCE, Paris (FR); CENTRE NATIONALE DE LA RECHERCHE SCIENTIFIQUE, Paris (FR); ECOLE NORMALE SUPÉRIEURE DE CACHAN, Cachan (FR)

(72) Inventors: Caroline Petiot, Les Ulis (FR); Stephane Roux, Rosny-Sous-Bois (FR); Francois Hild, Chatenay Malabry (FR)

(73) Assignees: AIRBUS GROUP SAS, Blagnac (FR); CENTRE NATIONAL DE LA RECHERCHE SCIENTIFIQUE, Paris (FR); ECOLE NORMALE SUPERIEURE DE CACHAN, Cachan (FR)

( * ) Notice: Subject to any disclaimer, the term of this patent is extended or adjusted under 35 U.S.C. 154(b) by 0 days.

(21) Appl. No.: 14/905,597

(22) PCT Filed: Jul. 9, 2014

(86) PCT No.: PCT/EP2014/064673
§ 371 (c)(1),
(2) Date: Jan. 15, 2016

(87) PCT Pub. No.: WO2015/007581
PCT Pub. Date: Jan. 22, 2015

(65) Prior Publication Data
US 2016/0155240 A1  Jun. 2, 2016

(30) Foreign Application Priority Data

Jul. 15, 2013  (FR) .................................... 13 56961

(51) Int. Cl.
*G06K 9/00* (2006.01)
*G06T 7/20* (2017.01)
(Continued)

(52) U.S. Cl.
CPC ............ *G06T 7/204* (2013.01); *G01B 11/167* (2013.01); *G01M 5/005* (2013.01);
(Continued)

(58) Field of Classification Search
CPC .............. G06T 7/00; G01B 11/00; G06K 9/00
(Continued)

(56) References Cited

U.S. PATENT DOCUMENTS 7,155,043 B2 * 12/2006 Daw ...................... G01R 33/56
128/920
8,423,337 B2 *  4/2013 Hsu ...................... E21B 49/006
166/250.01

FOREIGN PATENT DOCUMENTS

FR    2 842 591 A1    1/2004

OTHER PUBLICATIONS

Philip Siegmann et al.: "A simultaneous in- and out-of-plane displacement measurement method", Optic Letters, Optical Society of America, us, vol. 36, No. I, Jan. 1, 2011 (Jan. 1, 2011), pp. 10-12, XP001559791, ISSN: 0146-9592.
(Continued)

*Primary Examiner* — Abolfazl Tabatabai
(74) *Attorney, Agent, or Firm* — Young & Thompson

(57) ABSTRACT

Disclosed is a method for measuring movement and/or deformation of a study part subjected to an external stress, the method implementing a color digital image acquisition
(Continued)

device and image correlation unit. The method includes: acquisition (250) of a plurality of color digital images of the surface of the study part by way of the color digital image acquisition device during the application of an external stress on the study part, and processing (260) of the color digital images acquired in the step of acquisition of a plurality of color digital images so as to highlight contrasting details on variable scales.

20 Claims, 3 Drawing Sheets

(51) Int. Cl.
    *G01B 11/16*      (2006.01)
    *G01M 5/00*      (2006.01)
    *G01M 11/08*      (2006.01)
    *G06T 7/32*      (2017.01)
    *G06T 7/246*      (2017.01)
    *G06T 7/90*      (2017.01)
    *H04N 3/36*      (2006.01)

(52) U.S. Cl.
CPC ........... *G01M 11/081* (2013.01); *G06T 7/246* (2017.01); *G06T 7/248* (2017.01); *G06T 7/32* (2017.01); *G06T 7/90* (2017.01); *G06T 2207/10016* (2013.01); *G06T 2207/10024* (2013.01); *G06T 2207/30164* (2013.01); *G06T 2207/30208* (2013.01)

(58) Field of Classification Search
USPC ......... 382/107, 236; 348/14.1, 97, 154, 155, 348/208.13, 352, 407.1
See application file for complete search history.

(56) References Cited

OTHER PUBLICATIONS

Zonghlja Zhang et al.: "Time efficient color fringe projection system for 3D shape and color using optimum 3-frequency Selection", Optics Express, vol. 14, No. 14, Jan. 1, 2006 (Jan. 1, 2006), p. 6444, XP055107719, ISSN: 1094-4087, DOI: 10.1364/0E.14.006444 section 2 figure 1.

J P Chambard et al.: "Comptes Rendus des JNC 16—Toulouse 2009", May 20, 2009 (May 20, 2009), XP055107721, [retrieved on Mar. 13, 2014] section 2.1.

Fahrett in Oz turk et al.: "Grid Marking and Measurement Methods for Sheet Metal Formability", Jun. 18, 2009 (Jun. 18, 2009), XP055107727, [retrieved on Mar. 13, 2014] sections 2.1.2, 3.1.2 figure 4.

International Search Report, dated Sep. 5, 2014, from corresponding PCT application.

* cited by examiner

MULTI-SCALE METHOD FOR MEASURING THE SHAPE, MOVEMENT AND/OR DEFORMATION OF A STRUCTURAL PART SUBJECTED TO STRESSES BY CREATING A PLURALITY OF COLORIMETRIC SPECKLED PATTERNS

TECHNICAL FIELD

The invention relates to a method for measuring shape, movement and/or deformation of a structure subjected to external stresses by the creation of a plurality of speckled patterns. The invention is more particularly, but not exclusively, suited to the field of the techniques for measuring movements and/or deformations of a structure subjected to external stresses.

STATE OF THE ART

According to the prior art, the mechanical design of a structural part can implement an imaging technique making it possible to know its behavior and thus validate or not the structural design of said structural part. This imaging technique is applied also to test specimens of materials for mechanical characterization purposes. Consequently, hereinbelow, the generic term "study part" will cover, without distinction, structural parts or test specimens, independently of their size and of their shape.

Said technique makes it possible to measure movements and deformations of the study part when said study part is subjected to external stresses, for example mechanical and/or thermal stresses.

More specifically, said imaging technique implements a digital image acquisition device and digital image correlation software. The study part comprises a surface defined in an object reference frame (X, Y, Z). The surface of the study part is marked by a non-uniform pattern, random or not, called speckled pattern, recorded in the form of an image in gray levels. Said speckled pattern is characterized by a correlation length, that is to say a scale below which the marking is persistent. The mean quadratic difference of marking between two points for which the distance is less than or equal to this correlation length is small compared to the variance of gray levels of the speckled pattern. Furthermore, the study part comprises at least one region of interest that has to be studied.

The digital image acquisition device records at least one reference digital image of said surface. Said digital image is divided into pixels defined in an image reference frame (X',Y'). The non-uniform marking of the surface of the structure created by the speckled pattern is then rendered in the digital image by different gray levels from one pixel to another. A point P of the surface defined in the object reference frame (X, Y, Z) therefore corresponds to a pixel P' of the reference digital image, defined in the image reference frame (X',Y') and having a determined gray level.

An external stress is applied to the study part. Said stress deforms the study part and in particular the surface being studied. The point P of the surface is thus moved upon the application of loads into a position P'''. The digital image acquisition device records, at regular intervals, a series of digital images of the study part during the application of the external stress, and the local or global so-called digital image correlation analysis makes it possible to access a field of movement defined at any point of a region of interest at each stress level.

A variant of this technique, called stereo-correlation technique, allows for the measurement of three-dimensional shapes and of three-dimensional fields of movement. At least two digital images from different views of the study part are acquired at regular intervals during the application of the external stress. Said point P of the surface defined in the object reference frame (X, Y, Z) will appear in each digital image I at the point P'i in the digital image reference frame I. After a calibration step more often performed with a known reference pattern, the correlation of digital images makes it possible to associate, by means of the speckled patterns, the points P'i in each image I. In effect, a calibration step makes it possible to deduce, from the coordinates of each point P'i, the coordinates of the point P in the object reference frame (X, Y, Z). Furthermore, the fields of movements allow for the determination of three-dimensional movement vectors in the object reference frame (X, Y, Z) at any point of the surface of the study part.

However, depending on the scale of the correlation length of the speckled pattern, the fields of movement and/or of deformation are more or less accurate, more or less spatially resolved, and the measurement of the field of movement and/or of the field of deformation is more or less costly in computation time. In effect, the more the correlation length of the speckled pattern is reduced, the more costly the computation of the field of movement and/or of the field of deformation becomes, and the more accurate the field of movement and/or the field of deformation becomes. Conversely, the maximum amplitude of the movements that the image correlation will be capable of determining is of the order of magnitude of the correlation length. A fine speckled pattern is therefore not robust.

A compromise between spatial resolution and uncertainty must therefore be sought as a function of the desired accuracy and of the robustness of the processing. Either the operator chooses to prioritize the global measurements by creating a speckled pattern having great correlation lengths in order to obtain a field of movement and/or a field of deformation with relatively little spatial resolution, or the operator chooses to prioritize the local measurements by creating a speckled pattern having a small correlation length in order to obtain a field of movement and/or of deformation that is accurate and spatially resolved but that requires a good appreciation of the initial movement.

EXPLANATION OF THE INVENTION

The aim of the invention is notably to resolve this problem.

To this end, the invention relates to a method for measuring movement and/or deformation of a study part subjected to an external stress, said method implementing a color digital image acquisition device and image correlation means, characterized in that it comprises the following steps:
  acquisition of a plurality of color digital images of the surface of the study part by means of the color digital image acquisition device during the application of an external stress on said study part,
  processing of the color digital images acquired in the step of acquisition of a plurality of color digital images so as to highlight contrasting details on variable scales.

The invention can be implemented according to advantageous embodiments explained hereinbelow, which can be considered individually or in any technically feasible combination.

Advantageously, the method further comprises the following step:

creation of at least two speckled patterns on the surface of said study part, the first speckled pattern comprising a first color and the second speckled pattern having a second color different from the first color.

Thus, the creation of a number of speckled patterns with different correlation lengths makes it possible, after acquisition and processing of digital images of the surface of the study part, to determine, as a function of the type of measurement that the operator wants to perform, one or more fields of movement and/or deformation that are more or less spatially resolved. Furthermore, the first speckled pattern makes it possible to obtain a first determination of the field of movement used as a basis for the initialization of a second computation relying on the second speckled pattern.

Advantageously, the surface of the study part comprises a texture naturally having a first speckled pattern comprising a first color and a second speckled pattern comprising a second color different from the first color.

Advantageously, the first speckled pattern comprises a first correlation length and the second speckled pattern comprises a second correlation length different from the first correlation length.

Advantageously, the second correlation length is less than the first correlation length.

Advantageously, the step of processing of the color digital images comprises:

a substep of first colorimetric filtering of the color digital images in order to obtain a first series of filtered digital images comprising only the first speckled pattern;

a substep of second colorimetric filtering of the color digital images in order to obtain a second series of filtered digital images comprising only the second speckled pattern.

Advantageously, the step of processing of the color digital images comprises:

a substep of first colorimetric filtering of the color digital images in order to obtain a first series of filtered digital images comprising only the first speckled pattern;

a substep of second colorimetric filtering of the color digital images in order to obtain a second series of filtered digital images comprising the first speckled pattern and the second speckled pattern.

Advantageously, the method further comprises a step of determination of a first field of movement and/or of a first field of deformation from the first series of filtered digital images.

Advantageously, the method further comprises a step of determination of a second field of movement and/or of a second field of deformation from the second series of filtered digital images.

Advantageously, the step of determination of a second field of movement and/or of a second field of deformation is initialized by the first field of movement and/or the first field of deformation.

The present invention relates also to a system for measuring movement and/or deformation of a study part subjected to an external stress, said system comprising means for:

acquiring a plurality of color digital images of the surface of the study part by means of the color digital image acquisition device during the application of an external stress on said study part, processing color digital images acquired in the step of acquisition of a plurality of color digital images so as to highlight contrasting details on variable scales.

DESCRIPTION OF THE FIGURES

The invention will be better understood on reading the following description, given as a purely nonlimiting example, and with reference to the figures which represent.

In these figures, identical references from one figure to another denote identical or similar elements. For reasons of clarity, the elements represented are not to scale, unless otherwise stipulated.

DETAILED DESCRIPTION OF EMBODIMENTS

Figure 1:
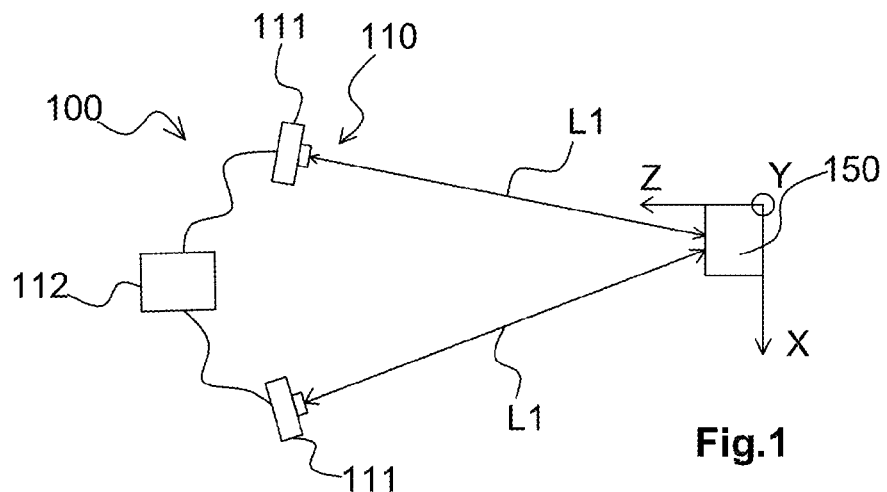
FIG. 1: a schematic representation of a device for measuring movement and/or deformation of a study part subjected to external stresses according to an exemplary embodiment of the invention using a system of image stereocorrelation with two fixed cameras.

FIG. 1 shows a device 100 for measuring movement and/or deformation of a study part 150 subjected to external stresses. In one example, said external stresses are mechanical and/or thermal stresses. The study part comprises a surface defined in an object reference frame (X, Y, Z).

In one embodiment, the measurement device 100 comprises a color digital image acquisition device 110 and image correlation means such as image correlation software. In one example, in the case of a conventional digital image correlation, the color digital image acquisition device 110 is a system comprising a fixed camera or photographic apparatus 111. In another example, in the case of a stereocorrelation, the color digital image acquisition device 110 is a system comprising a plurality of cameras and/or photographic apparatuses 111. Each camera and/or photographic apparatus 111 of the color digital image acquisition device 110 comprises photosensitive sensors, that is to say an electronic component that is used to convert an electromagnetic radiation into an analog electrical signal.

The color digital image acquisition device 110 further comprises one or more filters associated with each camera and/or photographic apparatus 111. In one example, each filter is positioned in front of the lens of the camera or the associated photographic apparatus 111.

In another example, each sensor comprises a matrix of photosites and a color filter comprising colored cells. Each photosite comprises a photodiode sensitive to all of the visible light spectrum. Each cell is associated with a photosite. In one example, the filter is a Bayer filter and a group of four photosites, adjacent in pairs, comprises a first photosite associated with a cell of red color, a second photosite associated with a cell of blue color, and the last two photosites being associated with a cell of green color. In another example, the color digital image acquisition device 110 comprises multispectral cameras, each comprising an essentially monochrome sensor and a filter making it possible to acquire the image over a number of wavelength intervals.

The color digital image acquisition device 110 further comprises a module 112 making it possible to process the analog electrical signals in order to obtain a digital image.

Figure 2:
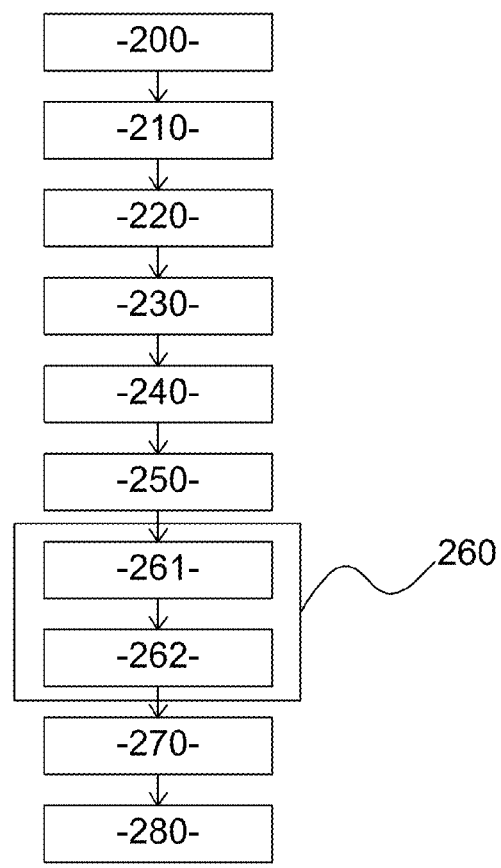
FIG. 2: a functional diagram showing different steps of the method according to an exemplary embodiment of the invention.

In a step 200, the color digital image acquisition device 110 is positioned so that the measurements of movement and/or of deformation are optimal (see FIG. 2).

In a step 210, an operator creates a first speckled pattern 300 on the surface of the study part 150.

A speckled pattern is a non-uniform pattern, random or not, created on the surface of the study part.

In one example, the pattern is deposited, painted or created by the spraying of drops of paint onto the surface of the study part. Said pattern comprises a set of irregular patterns, that is to say, for example, a set of spots that are mutually different in size, in shape and/or in orientation but of which the size and the distance between two adjacent spots are of a comparable order of magnitude equivalent here to the correlation length.

Figure 3:
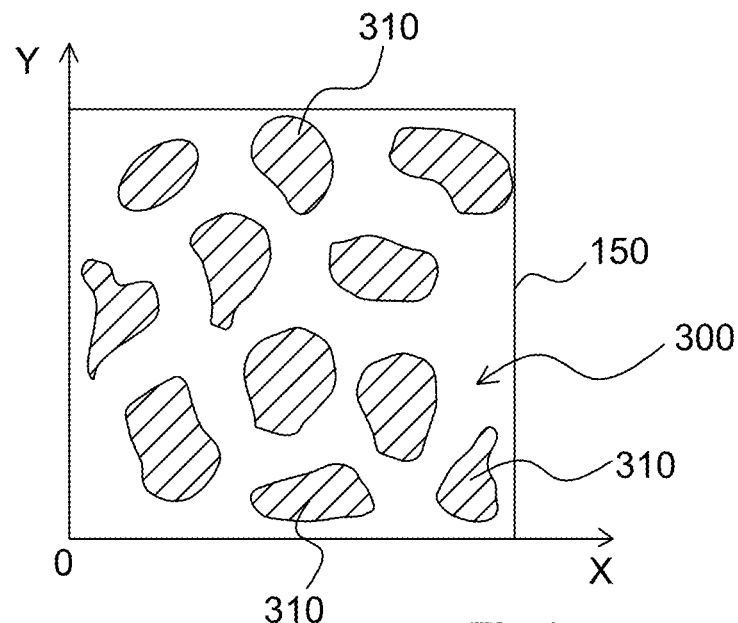
FIG. 3: a schematic representation of the surface of a study part comprising a first speckled pattern according to an exemplary embodiment of the invention.

FIG. 3 shows said first speckled pattern 300, which comprises a plurality of spots 310. This first speckled pattern 300 is associated with a first correlation length and a first color.

The term color denotes a plurality of local characteristics attributed to the same point of the surface of the study part, corresponding to the response of said point to a wavelength of the light source.

Figure 4:
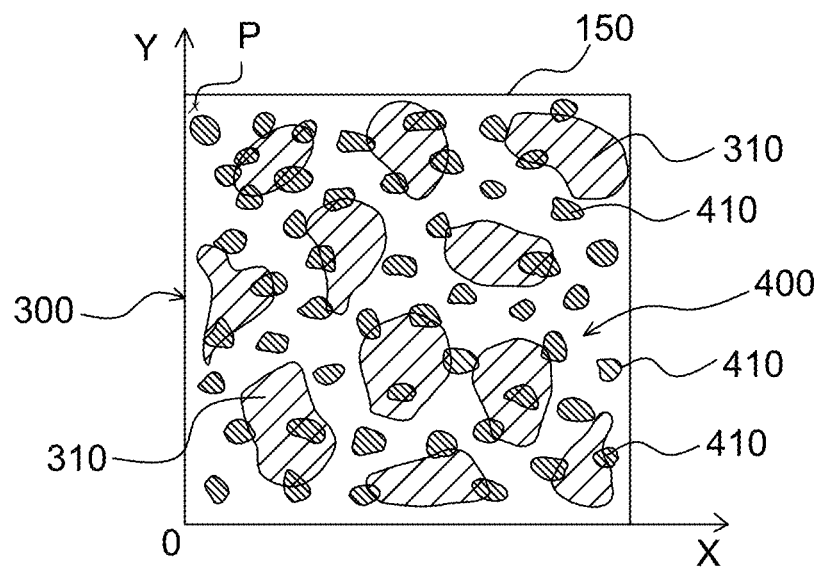
FIG. 4: a schematic representation of the surface of a study part comprising a first speckled pattern and a second speckled pattern according to an exemplary embodiment of the invention.
Figure 5:
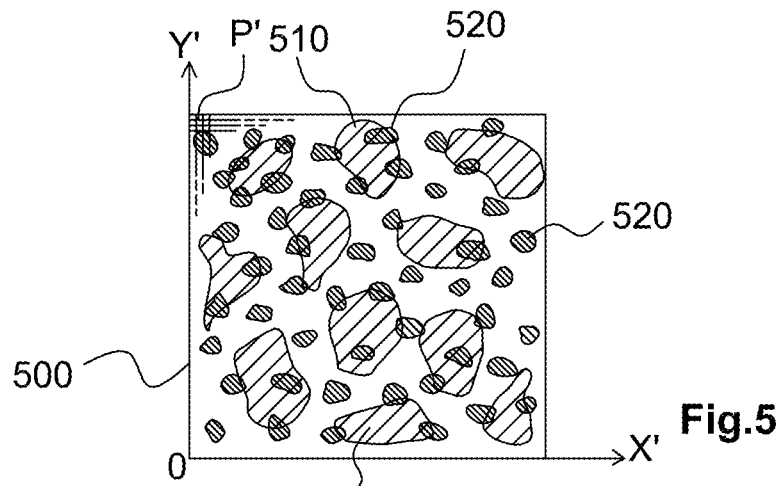
FIG. 5: a schematic representation of a digital image of the surface of a study part according to an exemplary embodiment of the invention.

In a step 220, the operator creates a second speckled pattern 400 on the surface of the study part 150 (see FIG. 4). Said second speckled pattern 400 comprises a plurality of spots 410. This second speckled pattern 400 is associated with a second correlation length and a second color. The second correlation length is different from the first correlation length and the second color is different from the first color. In one example, the second correlation length is less than the first correlation length.

In a variant, the surface of the study part 150 comprises a texture naturally having a first speckled pattern 300 associated with a first correlation length and a first color, and a second speckled pattern 400 associated with a second correlation length different from the first correlation length and a second color different from the first color.

The creation or the natural existence of a number of speckled patterns 300 and 400 having different correlation lengths and colors makes it possible, after acquisition and processing of digital images of the surface of the study part 150, to measure, as a function of the type of measurement that the operator wants to perform, one or more fields of movement and/or of deformation that are more or less spatially resolved.

The capacity to modulate the smallest spatial correlation scales by a filter acting on the color coding of the color image is a specific feature of the invention which makes it possible to adjust at will the robustness of the measurement and its fineness of spatial description. The same filtering can be produced by conventional optical means through a plurality of images, or else through narrow chromatic filters, as for hyperspectral imaging.

In an exemplary implementation, the operator produces a first speckled pattern 300 from a red paint bomb and from a white paint bomb. Then, said operator creates the second speckled pattern 400 by adding spots of blue paint using a brush or a stencil. The first color then corresponds to a wavelength greater than or equal to 620 nanometers, whereas the wavelength of the second speckled pattern is essentially less than 500 nanometers. In this example, the correlation length of the first speckled pattern is ten times greater than the correlation length of the second speckled pattern.

Other speckled patterns are created as a function of the requirements of the operator and of the capacity of the color digital image acquisition device 110, in particular of the definition of said color digital image acquisition device 110, and of the module 112 to separate the colors and the dimensions.

In a step 230, the color digital image acquisition device 110 records a color reference digital image 500 of the surface of the study part 150.

In a step 240, an external stress is applied to the study part 150. Said stress deforms the study part and in particular the surface being studied. A point P of the surface is moved upon the application of the mechanical loads into a final position of unknown coordinates in the object reference frame (X, Y, Z). The spots 310 of the first speckled pattern 300 and the spots 410 of the second speckled pattern 400 are therefore moved and deformed. In a step 250, the color digital image acquisition device 110 records, at regular intervals, a series of color digital images 500 of the surface of the study part 150 during the application of the mechanical and/or thermal stress. Each color digital image 500 is divided into pixels P' defined in an image reference frame (X', Y'). The point P of the surface of the study part 150 defined in the object reference frame (X, Y, Z) therefore corresponds to a pixel P', for each color digital image 500, defined in the image reference frame (X', Y'). Furthermore, each pixel P' of each digital image 500 comprises a color.

A color digital image can result from the aggregation of a plurality of digital images acquired successively, for example with different light sources, or else be acquired simultaneously when the color digital image acquisition device 110 comprises a matrix of sensors having sites of different sensitivities. The colorimetric or chromatic processing operations described hereinbelow encompass all the digital processing operations that make use of this plurality of information in order to extract therefrom a number of images in "gray levels" having different geometric characteristics, linked to the speckled patterns, but without alteration of the position of the pixels.

The aim is not necessarily to specifically isolate one color or one speckled pattern, but to demonstrate the capacity to eliminate the high spatial frequencies from the filtered image over a predefined range to achieve a better robustness.

This color is coded in red, green and blue (RGB) levels. Thus, each color is expressed as a combination of these three colors. In a variant, the color is coded from a different coding format, for example in cyan, magenta, yellow and black levels for the four-color process (CMYK), or a much finer spectral resolution for multispectral or hyperspectral cameras. Spots 510 corresponding to the spots 310 of the first speckled pattern 300 and spots 520 corresponding to the spots 410 of the second speckled pattern 400 therefore appear on each color digital image 500.

In a step 260, the image correlation software processes the color digital images 500 recorded by the color digital image acquisition device 110 in the step 230 of recording of the color reference digital image 500 and in the step 250 of recording of a series of color digital images 500. The processing of the color digital images 500 comprises steps of colorimetric filtering of the color digital images 500 in order to separate the colors of the digital images.

Figure 6:
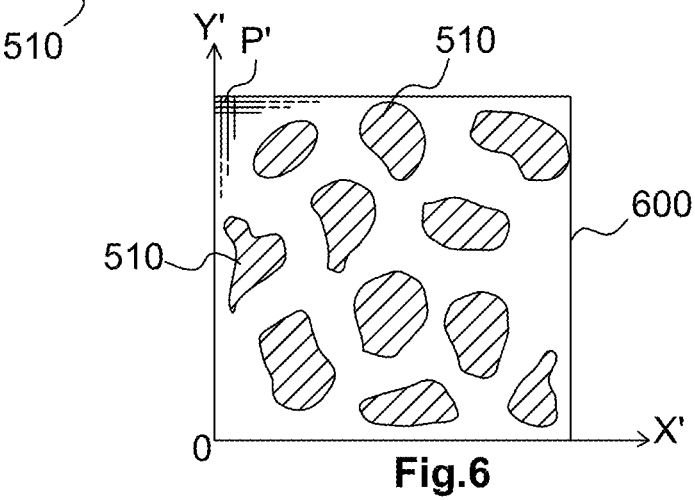
FIG. 6: a schematic representation of a digital image of the surface of a study part after a first filtering according to an exemplary embodiment of the invention.

More specifically, in a substep 261, a first colorimetric filtering is performed from each color digital image 500 in order to extract the pixels having a level, for example, of red, of green and of blue corresponding to the first color band. At the end of this substep 261, a first series of filtered digital images 600 comprising only the spots 510 corresponding to the spots 310 of the first speckled pattern 300 is obtained (see FIG. 6).

Figure 7:
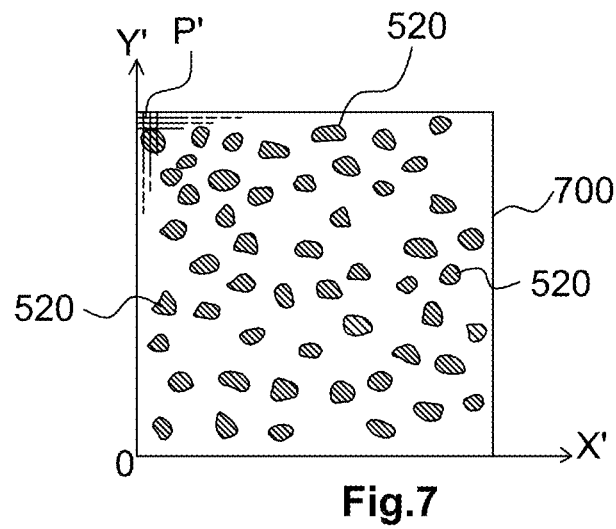
FIG. 7: a schematic representation of a digital image of the surface of a study part after a second filtering according to an exemplary embodiment of the invention.

In a substep 262, a second colorimetric filtering is performed from each color digital image 500 in order to extract the pixels having a level, for example, of red, of green and of blue corresponding to the second color. At the end of this substep 262, a second series of filtered digital images 700 comprising only the spots 520 corresponding to the spots 410 of the second speckled pattern 400 is obtained (see FIG. 7).

In a step 270, the image correlation software determines, from the first series of filtered digital images 600, a first field of movement and/or a first field of deformation. In the case of stereovision, the image correlation also makes it possible to determine a global three-dimensional shape.

In a step 280, the image correlation software determines, from the second series of filtered digital images 700, a second field of movement and/or a second field of deformation. In one embodiment, the first field of movement and/or first field of deformation is used as prior information. In the case of stereovision, the three-dimensional shape is refined. It should be noted that this processing operation can be performed on a limited region of the surface being examined which exhibits a specific interest.

The creation of a number of speckled patterns with different correlation lengths and colors thus makes it possible, after acquisition and processing of color digital images of the surface of the study part 150, to create, as a function of the type of measurement that the operator wants to perform, one or more fields of movement and/or of deformation that are more or less spatially resolved.

In effect, if the operator wants to perform a local measurement of movement at the periphery of the area of introduction of an external stress in order to check the quality and/or the uniformity of the external stress and, thus, check the conditions at the limits, or if the operator wants to perform a local measurement of movement and of deformation on the study part 150 in order to determine damage on a structural element of the study part 150 such as, for example, a stiffener stop, a bonded, welded or bolted link, or a decreasing scale of thickness, said operator uses the field of movement created from the series of filtered digital images 600, 700 on which the spots 510, 520 of which the surface lies within the highest value range appear.

Furthermore, if the operator wants to perform a measurement of movement and of deformation on all of the study part 150, or on a wide area of the study part 150, in order to determine the existence and quantify certain phenomena of instability of the study part 150, such as buckling or post-buckling, said operator uses the field of movement and the field of deformation created from the series of filtered digital images 600, 700 on which the spots 510, 520 of which the surface lies within the lowest value range appear.

Furthermore, the operator can use, in parallel, the fields of movement and/or of deformation created from each series of filtered digital images 600, 700.

The invention claimed is:

1. A method for measuring movement and/or deformation of a study part (150) subjected to an external stress, said method implementing a color digital image acquisition device (110) and image correlation means, comprising the steps of:
   applying an external stress on said study part (150),
   acquiring (250) a plurality of color digital images (500) of the surface of the study part (150) by means of the color digital image acquisition device (110) while applying the external stress on said study part (150),
   processing (260) of the color digital images (500) acquired in the step of acquisition (250) of a plurality of color digital images (500) so as to highlight contrasting details on variable scales, and
   correlating (270, 280) all of the processed digital images (260) to determine the fields of movement on the scales associated with each processing operation (260).

2. The method according to claim 1, further comprising the following step:
   creation (210, 220) of at least two speckled patterns on the surface of said study part (150), the first speckled pattern (300) comprising a first color and the second speckled pattern (400) having a second color different from the first color.

3. The method according to claim 2, wherein the first speckled pattern (300) comprises a first correlation length and the second speckled pattern (400) comprises a second correlation length different from the first correlation length.

4. The method according to claim 3, wherein the second correlation length is less than the first correlation length.

5. The method according to claim 4, wherein the step of processing (260) of the color digital images (500) comprises:
   a substep (261) of first colorimetric filtering of the color digital images (500) in order to obtain a first series of filtered digital images (600) comprising only the first speckled pattern (300);
   a substep (262) of second colorimetric filtering of the color digital images (500) in order to obtain a second series of filtered digital images (700) comprising only the second speckled pattern (400).

6. The method according to claim 4, wherein the step of processing (260) of the color digital images (500) comprises:
   a substep (261) of first colorimetric filtering of the color digital images (500) in order to obtain a first series of filtered digital images (600) comprising only the first speckled pattern (300);
   a substep (262) of second colorimetric filtering of the color digital images (500) in order to obtain a second series of filtered digital images (700) comprising the first speckled pattern (300) and the second speckled pattern (400).

7. The method according to claim 3, wherein the step of processing (260) of the color digital images (500) comprises:
   a substep (261) of first colorimetric filtering of the color digital images (500) in order to obtain a first series of filtered digital images (600) comprising only the first speckled pattern (300);
   a substep (262) of second colorimetric filtering of the color digital images (500) in order to obtain a second series of filtered digital images (700) comprising only the second speckled pattern (400).

8. The method according to claim 3, wherein the step of processing (260) of the color digital images (500) comprises:
- a substep (261) of first colorimetric filtering of the color digital images (500) in order to obtain a first series of filtered digital images (600) comprising only the first speckled pattern (300);
- a substep (262) of second colorimetric filtering of the color digital images (500) in order to obtain a second series of filtered digital images (700) comprising the first speckled pattern (300) and the second speckled pattern (400).

9. The method according to claim 2, wherein the step of processing (260) of the color digital images (500) comprises:
- a substep (261) of first colorimetric filtering of the color digital images (500) in order to obtain a first series of filtered digital images (600) comprising only the first speckled pattern (300);
- a substep (262) of second colorimetric filtering of the color digital images (500) in order to obtain a second series of filtered digital images (700) comprising only the second speckled pattern (400).

10. The method according to claim 9, further comprising a step (270) of determination of a first field of movement and/or of a first field of deformation from the first series of filtered digital images (600).

11. The method according to claim 10, wherein the step (280) of determination of a second field of movement and/or of a second field of deformation is initialized by the first field of movement and/or the first field of deformation.

12. The method according to claim 10, further comprising a step (280) of determination of a second field of movement and/or of a second field of deformation from the second series of filtered digital images (700).

13. The method according to claim 2, wherein the step of processing (260) of the color digital images (500) comprises:
- a substep (261) of first colorimetric filtering of the color digital images (500) in order to obtain a first series of filtered digital images (600) comprising only the first speckled pattern (300);
- a substep (262) of second colorimetric filtering of the color digital images (500) in order to obtain a second series of filtered digital images (700) comprising the first speckled pattern (300) and the second speckled pattern (400).

14. The method according to claim 13, further comprising a step (280) of determination of a second field of movement and/or of a second field of deformation from the second series of filtered digital images (700).

15. The method according to claim 13, further comprising a step (270) of determination of a first field of movement and/or of a first field of deformation from the first series of filtered digital images (600).

16. The method according to in claim 1, wherein the surface of the study part (150) comprises a texture naturally having a first speckled pattern (300) comprising a first color and a second speckled pattern (400) comprising a second color different from the first color.

17. The method according to claim 16, wherein the first speckled pattern (300) comprises a first correlation length and the second speckled pattern (400) comprises a second correlation length different from the first correlation length.

18. The method according to claim 16, wherein the step of processing (260) of the color digital images (500) comprises:
- a substep (261) of first colorimetric filtering of the color digital images (500) in order to obtain a first series of filtered digital images (600) comprising only the first speckled pattern (300);
- a substep (262) of second colorimetric filtering of the color digital images (500) in order to obtain a second series of filtered digital images (700) comprising only the second speckled pattern (400).

19. The method according to claim 16, wherein the step of processing (260) of the color digital images (500) comprises:
- a substep (261) of first colorimetric filtering of the color digital images (500) in order to obtain a first series of filtered digital images (600) comprising only the first speckled pattern (300);
- a substep (262) of second colorimetric filtering of the color digital images (500) in order to obtain a second series of filtered digital images (700) comprising the first speckled pattern (300) and the second speckled pattern (400).

20. A system for measuring movement and/or deformation of a study part (150) subjected to an external stress, said system comprising:
- a color digital image acquisition device (110) configured to acquire (250) a plurality of color digital images (500) of the surface of the study part (150) during the application of an external stress on said study part (150), and
- a processor configured to:
- process (260) color digital images (500) acquired by the color digital image acquisition device (110) in the acquisition (250) of a plurality of color digital images (500) so as to highlight contrasting details on variable scales, and
- correlate (270, 280) all of the processed digital images (260) to determine the fields of movement on the scales associated with each processing operation (260).

* * * * *